United States Patent [19]

Satomi et al.

[11] Patent Number: 5,067,150
[45] Date of Patent: Nov. 19, 1991

[54] TELEPHONE NUMBER DISPLAY DEVICE

[75] Inventors: Mitsuo Satomi, Kyoto; Kazuaki Oshita, Hirakata; Tetsuya Kuwahara, Shiga, all of Japan

[73] Assignee: Murata Kikai Kabushiki Kaisha, Kyoto, Japan

[21] Appl. No.: 485,958

[22] Filed: Feb. 27, 1990

[30] Foreign Application Priority Data

Mar. 1, 1989 [JP] Japan ................. 1-23719[U]

[51] Int. Cl.⁵ ............................................. H04M 1/26
[52] U.S. Cl. ................................. 379/354; 379/396; 379/142
[58] Field of Search ............... 379/354, 142, 355, 356, 379/396, 100

[56] References Cited

U.S. PATENT DOCUMENTS

| | | | |
|---|---|---|---|
| 4,090,037 | 5/1978 | Benjamin et al. | 379/354 |
| 4,286,118 | 8/1981 | Mehaffey et al. | 379/142 X |
| 4,709,387 | 11/1987 | Masuda | 379/354 |
| 4,720,855 | 1/1988 | Ohnishi et al. | 379/355 X |
| 4,726,059 | 2/1988 | Havel | 379/354 |
| 4,825,464 | 4/1989 | Wen | 379/354 |
| 4,829,559 | 5/1989 | Izawa et al. | 379/100 X |
| 4,845,745 | 7/1989 | Havel | 379/396 X |
| 4,924,496 | 5/1990 | Figa et al. | 379/355 X |

FOREIGN PATENT DOCUMENTS

| | | | |
|---|---|---|---|
| 0047758 | 4/1980 | Japan | 379/354 |
| 0019460 | 1/1984 | Japan | 379/354 |
| 0264753 | 11/1987 | Japan | 379/354 |
| 0284553 | 12/1987 | Japan | 379/354 |
| 0277044 | 11/1989 | Japan | 379/354 |

OTHER PUBLICATIONS

British Telecommunication Engineering, vol. 4, Jul. 85, p. 120 Product News, "Merlin TX 72 Featurephone".

Primary Examiner—James L. Dwyer
Assistant Examiner—M. Shehata
Attorney, Agent, or Firm—Spensley Horn Jubas & Lubitz

[57] ABSTRACT

A telephone number display device adapted to a facsimile machine having a telephone function comprises a telephone number input device, display device having first and second display areas for displaying a telephone number, and display mode controller for controlling the display device so as to display the telephone number given by the telephone number input devices in the first display area to the maximum number of places thereof and, when the telephone number overflows the first display area, the telephone number is divided into two groups and displayed in two display areas.

4 Claims, 4 Drawing Sheets

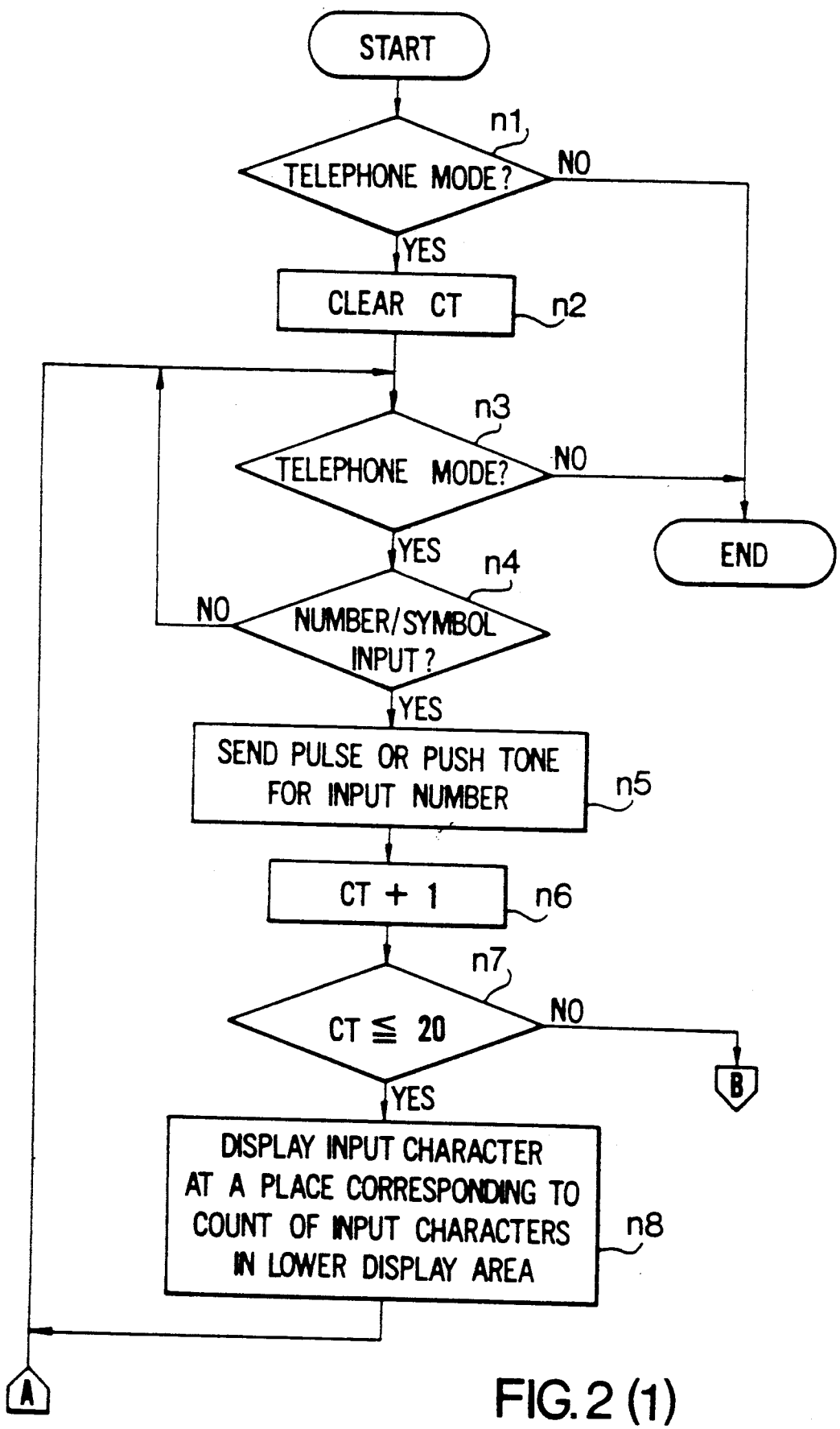
FIG.2 (1)

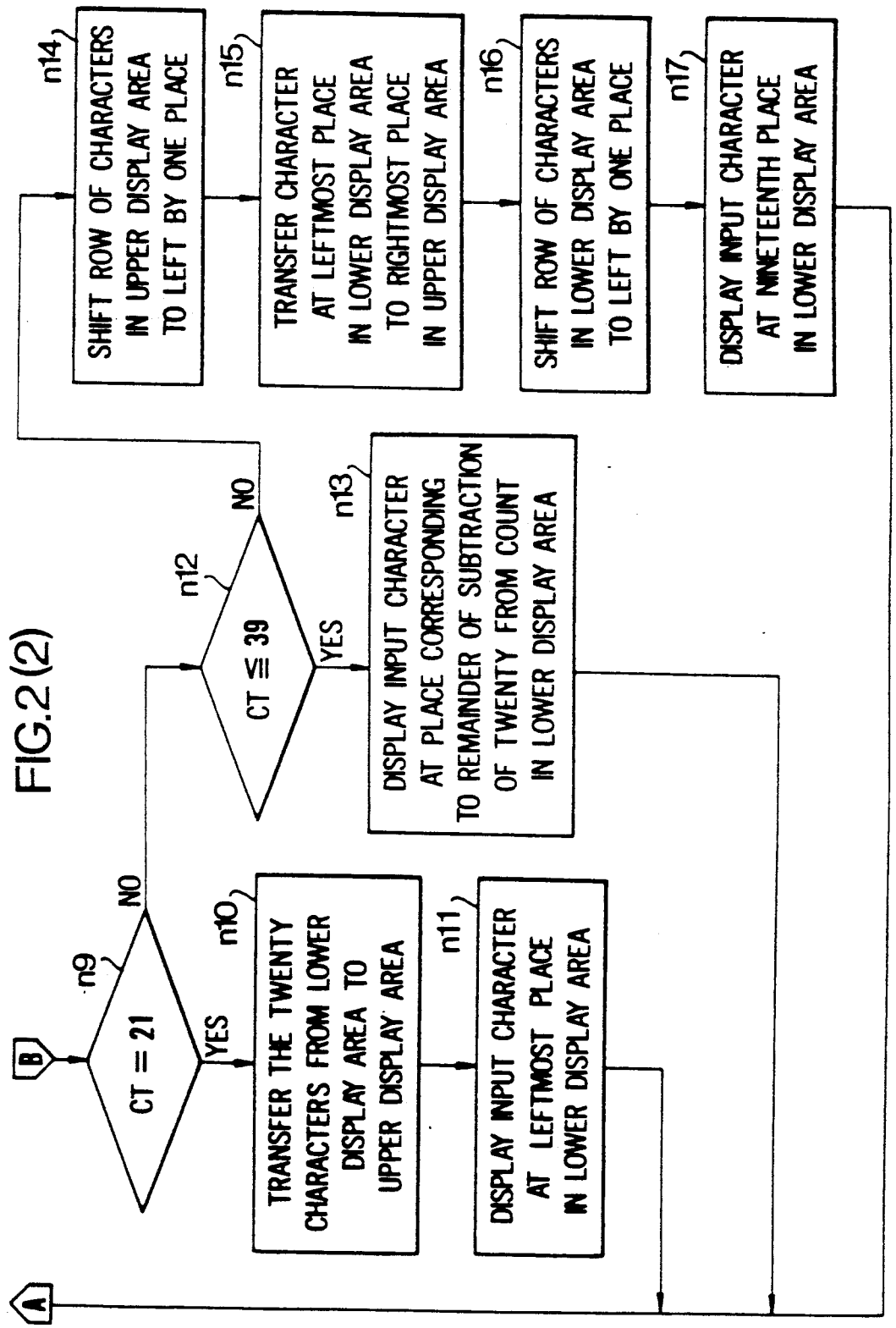

FIG. 3 (1)
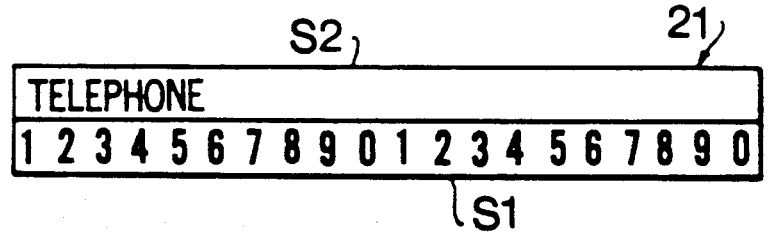
FIG. 3 (2)
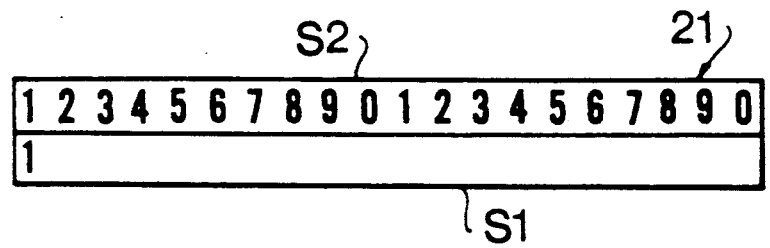
FIG. 3 (3)
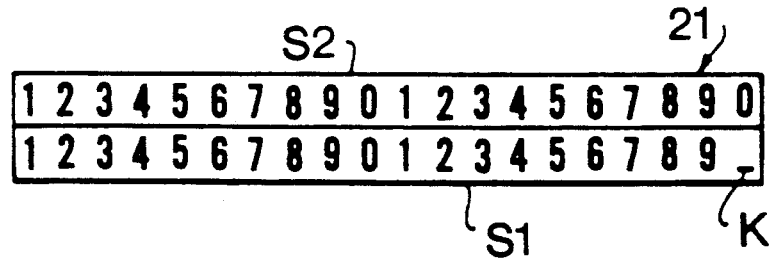
FIG. 3 (4)
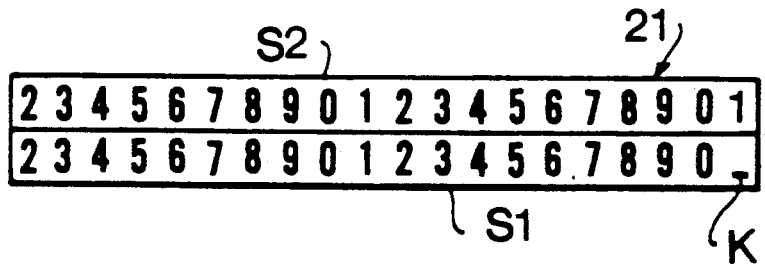

TELEPHONE NUMBER DISPLAY DEVICE

BACKGROUND OF THE INVENTION

1. Technical Field

The present invention relates to a display device to be incorporated into, for example, the display unit of a facsimile equipment having telephone functions.

2. Background Art

In using a conventional facsimile equipment with telephone functions, as a telephone set, the handset is picked up or a special key, such as a hook key, of the facsimile equipment is depressed to connect the facsimile equipment to a telephone line, and then a special key provided on the facsimile equipment for displaying the telephone number of a called party is depressed to display the telephone number on the display unit of the facsimile equipment, to retrieve the telephone number and to activate a network control unit (hereinafter abbreviated to "NCU").

Recently, the number of figures of a telephone number has increased with the expansion of the telphone network. In some cases, such a telephone number having a large number of figures overflows the conventional display unit when the number of figures exceeds the maximum number of figures of the display unit. In such a case, it is impossible to dial the telephone number while confirming the previously stored telephone number since some numerals are out of display. This makes dialing inconvenient.

Simply increasing the length of the display area is not a good idea because a longer display unit is not available in the market or a special order is required to obtain the longer display unit suited for the facsimile machine. In other words, increase in the length of the display area is limited to a certain extent or a cost would be raised.

SUMMARY OF THE INVENTION

Accordingly, it is an object of the present invention to provide a telephone number display device capable of displaying a telephone number of a very large number of places without affecting cost and price of the device very much.

According to one aspect of the present invention, there is provided a telephone number display device which comprises a telephone number input device, display device having first and second display areas for displaying a telephone number, and display mode controller for controlling the display device so as to display the telephone number given by the telephone number input devices in the first display area to the maximum number of places thereof and, when the telephone number overflows the first display area, the telephone number is divided into two groups and displayed in two display areas.

When the number of places of the telephone number is less than the maximum number of places of the first display area, the telephone number is displayed only in the first display area. When the number of places of the telephone number is greater than the maximum number of places of the first display area, first a portion of the telephone number corresponding to the maximum number of places of the first display area is displayed in the first display area, and then the figures displayed in the first display area transferred to the second display area and the rest of the figures are displayed in the first display area from left to right. Thus, the display device is capable of displaying a telephone number having a very large number of places in the first and second display areas, which makes it possible for an operator to confirm the telephone number during dialing. Also, displaying a telephone number of a large number of places in a plurality of display areas arranged one over another using two ordinary display units obviates cost-up of a facsimile machine.

BRIEF DESCRIPTION OF THE DRAWINGS

The above and other objects, features and advantages of the present invention will become more apparent from the following description taken in connection with the accompanying drawings, in which:

FIG. 2(1) and 2(2) are a set of views showing flowcharts of a control program for telephone number display operation; and FIG. 3(1), 3(2), 3(3) and 3(4) are illustrations useful to explain modes of displaying a telephone number on a liquid crystal display, respectively.

DESCRIPTION OF THE PREFERRED EMBODIMENTS

Figure 1:
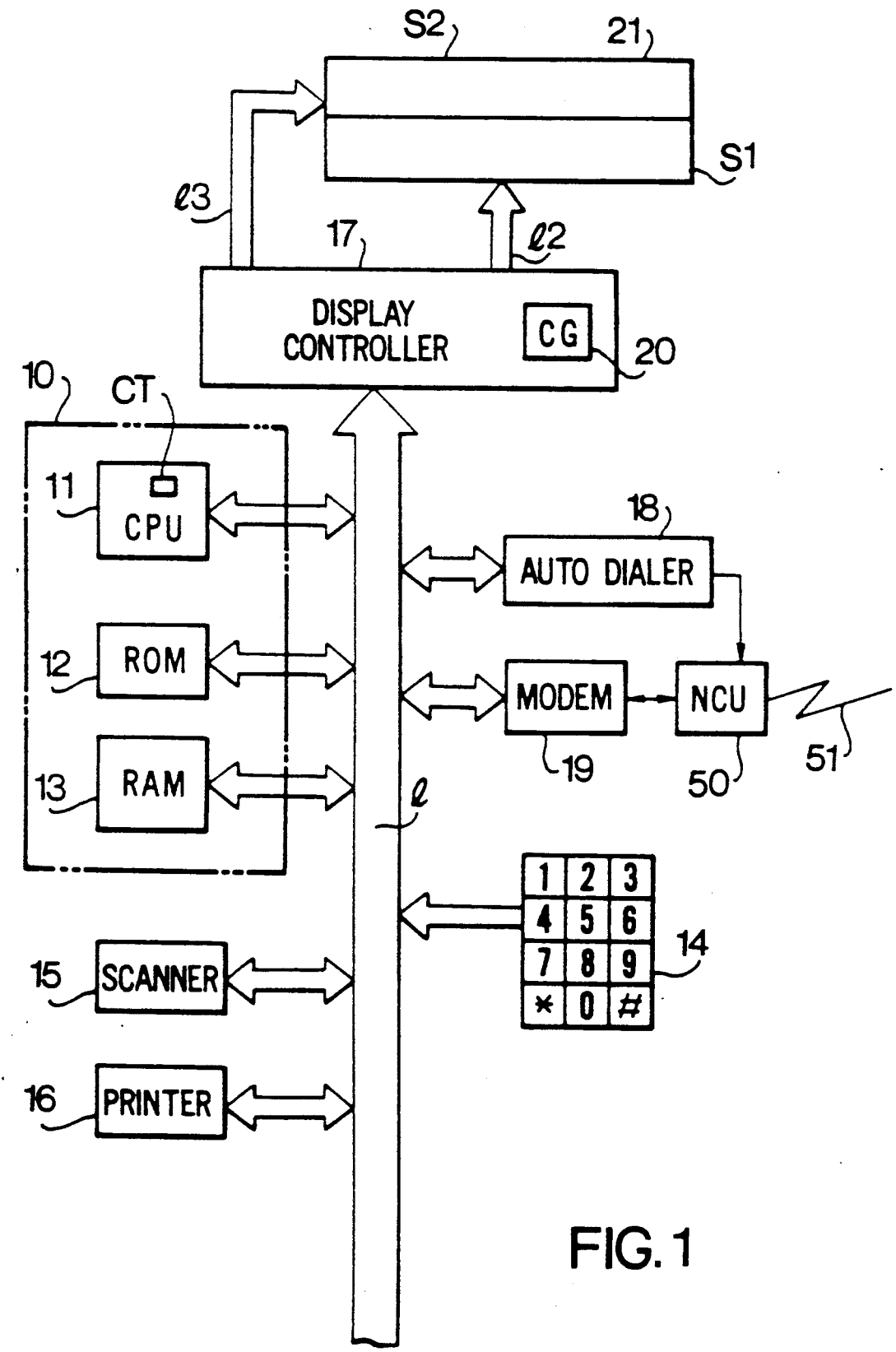
FIG. 1 is a block diagram of a facsimile equipment with telephone functions, incorporating a telephone number display device according to the present invention.

Referring to FIG. 1 showing a facsimile equipment with telephone functions, a control unit 10 comprises a CPU 11, a ROM 12 storing programs including a system program, and a RAM 13 storing a translation table for converting an abbreviated telephone number into a corresponding real telephone number. The ROM 12 and the RAM 13 are connected to the CPU 11 by a bus 1. A numeric key unit 14, a scanning unit 15 for scanning a document, a printing unit 16 for printing out a received image, an automatic dialing unit 18 and MODEM 19 are connected individually to the CPU 11 by the bus 1. An NCU 51 controls a line 51.

A display device embodying the present invention incorporated into the facsimile equipment comprises a display control unit 17 having a character generator 20 and connected to the CPU 11 by the bus 1, and a liquid crystal display 21. The display control unit 17 controls the liquid crystal display 21 for displaying characters. The liquid crystal display 21 has a first display area S1 for displaying the telephone number of a called party, and a second display area S2 formed over the first display area S1 for displaying a message, such as the name of the called party. In this embodiment, the character display capacity, namely, the maximum number of places, of each of the first display area S1 and the second display area S2 is twenty, respectively. In displaying a telephone number on the liquid crystal display 21, the CPU 11 gives control signals representing character codes, places for characters, a cursor, a place for the cursor and the like to the display control unit 17. Then, the character generator 20 of the display control unit 17 generates dot patterns of characters and gives control signals representing the dot patterns through lines 12 and 13 to the corresponding bits of the liquid crystal display to display the characters in the display areas S1 and S2 of the liquid crystal display 21.

The operation for displaying a telephone number on the liquid crystal display 21 will be described hereinafter with reference to FIG. 2.

When the handset is lifted up, a query is made in step n1 to see if the facsimile equipment is in a telephone mode. When the response in step n1 is affirmative, an input counter CT (FIG. 1) for counting the number of inputs representing the telephone number is cleared in step n2, and then a query is made in step n3 to see if the facsimile is in the telephone mode again. When the response in step n3 is affirmative, a query is made in step n4 to see if a number or a symbol is given by the numeric key unit 14 or the character key. When the response in step n4 is negative, the program returns to step n3. When the response in step n4 is affirmative, a pulse signal or a push tone representing the input number is applied through the NCU to the line 51 by the instructions of step n5. Then, in step n6, the count of the input counter CT is incremented by one. Then, in step n7, a query is made to see if the count of the input counter CT is less than twenty, namely, if the number of figures is less than the figure display capacity of the first display area S1. When the response in step n7 is affirmative, the input telephone number is displayed from left to right at a place corresponding to the count of the input counter CT in the first display area S1. After that, the program returns to step n3. Subsequently, a loop of steps n3 - n4 - n5 - n6 - n7 - n8 - n3 is repeated to display the telephone number in the first display area S1 as shown in FIG. 3(1). When a number, for example, "1" is given after the number of figures of the numbers displayed in the first display area S1 has reached "20", the count of the input counter CT hits "21", and hence the response in step n7 becomes negative. Then, the program goes from step n7 to step n9, at which a query is made to see if the count of the input counter CT is "21". When the response in step n9 is affirmative, a row of the twenty figures displayed in the first display area S1 is transferred to the second display area S2 in step n10. Then, in step n11, the last input letter "1" is displayed at the leftmost place in the first display area S1 as shown in FIG. 3(2).

After step n11, the program returns to step n3. When another number is input, steps n3, n4, n5, n6, n7 and n9 are executed, and then the program goes to step n12. In step n12, a query is made to see if the count of the input counter CT is less than "39", which is the remainder of subtraction of one place for a cursor from the maximum figure display capacity, i.e., "40", of the liquid crystal display unit 21. When the response in step n12 is affirmative, the figure is displayed at a place corresponding to the remainder of subtraction of "20" from the count of the input conter CT in the first display area S1, and then the program returns to step n3.

A loop of steps n3 - n4 - n5 - n6 - n7 - n9 - n12 - n13 - n3 is repeated as numbers are further given. When thirty-nine-figure-number is given, the liquid crystal display 21 displays twenty figures in the second display area S2 and nineteen figures in the first display area S1 from left to right, with a cursor K at the rightmost place in the first display area S1 as shown in FIG. 3(3). If a fortieth figure is given, the count of the input counter CT reaches "40", and hence the response in step n12 becomes negative. Then, the program goes to step n14. In step n14, the row of numbers in the second display area S2 is shifted to the left by one place, the leftmost number in the first display area S1 is moved to the rightmost place in the second display area S2 in step n15, the row of the rest of the numbers in the first display area S1 is shifted to the left by one place in step n16, and then the new number is displayed at the nineteenth place in the first display area S1.

For example, when a new number "0" is given in a state shown in FIG. 3(3), the twenty figures in the second display area is shifted to the left by one place whereby the number "1" at the first place in the second display area S2 is deleted and the twentieth place in the second display area S2 becomes vacant. Then, the number "1" displayed at the first place in the first display area S1 is transferred to the twentieth place of the second display area S2. Subsequently, the numbers displayed from the second place to the nineteeth place in the first display area S1 are shifted to the left by one place, and then the newly input number "0" is displayed at the nineteenth place in the first display area S1 as shown in FIG. 3(4).

After the step n17 has been executed, the program returns to step n3. When more numbers are given successively, a loop of steps n3 - n4 - n6 - n7 - n9 - n12 - n14 - n15 - n16 - n17 - n13 is repeated to shift the numbers displayed in the second display area S2 to the left by one place at a time, to transfer the numbers in the first display area S1 sequentially by one number at a time to the twentieth place in the second display area S2, and to display the new numbers sequentially at the nineteenth place in the first display area S1.

Thus, a telephone number is displayed only in the first display area S1 when the number of places of the telephone number is less than twenty. A telephone number of a number of places not less than "20" is displayed in both the first display area S1 and the second display area S2.

Although the invention has been described in its preferred form with a certain degree of particularity, obviously many changes and variations are possible therein. It is therefore to be understood that the invention may be practiced otherwise than as specifically described herein without departing from the scope and spirit thereof. For example, the liquid crystal display 21 may have three or more display areas arranged one over another to increase the figure display capacity of itself. Also, the first display area S1 and the second display area S2 may be interchanged to arrange the first display area S1 over the second display area S2. When the display area S1 and S2 are thus arranged, step n10 for transferring the figures displayed in the first display area S1 to the second display area S2 can be omitted. Furthermore, the present invention is applicable to displaying, for example, the name of a called party by characters both in the first and second display areas.

In summary, the display device having two or more display areas stacked one over another can be incorporated into a facsimile equipment without raising the price of the device very much.

We claim:

1. A telephone number display device adapted to a facsimile machine having a telephone function, comprising:

telephone number input means for entering a telephone number comprising a plurality of characters;

display means having first and second display areas for displaying a telephone number given by the telephone number input means, the first display area being disposed below the second display area and the first display area comprising a plurality of display positions equal in number to n, where n is an integer; and display mode control means for controlling the display means so as to display the telephone number given by the telephone number input means in the first display area to maximum number of places thereof and, when the telephone number overflows the first display area, the telephone number is divided into two groups and displayed in the first and second display areas, the display mode control means comprising:

means for displaying the characters of the telephone number in the first display area from left to right as the characters of the telephone number are entered by the telephone number input means, and means for transferring the first n characters of the telephone number provided by the telephone number input means from the first display area to the second display area when the number of characters of the telephone number entered by the telephone input means exceeds n, whereby the number of characters of the telephone number in excess of n are displayed in the first display area from left to right as the characters of the telephone number are entered by the telephone number input means.

2. A telephone number display device of claim 1, wherein the display means includes a third display area for displaying numerals overflowing the two display areas.

3. A telephone number display device of claim 1, wherein the telephone number input means possesses an abbreviated telephone number input function and the display mode control means includes a CPU, a ROM storing a system program and a RAM storing a translation table for converting an abbreviated telephone number into a corresponding real telephone number.

4. A telephone number display device of claim 1, wherein the first display area is disposed below the second display area and the display means displays a telephone number in the first display area and a name of a party called in the second display area when the first display area can display the entire telephone number.

* * * * *